United States Patent
Fujii et al.

(10) Patent No.: US 7,219,774 B2
(45) Date of Patent: May 22, 2007

(54) DOUBLE-WRAP BRAKE BAND ASSEMBLY

(75) Inventors: Tamotsu Fujii, Hamamatsu (JP); Xiaoming Gu, Fukuroi (JP); Hideaki Takabayashi, Hamakita (JP); Osamu Tanaka, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 11/367,540

(22) Filed: Mar. 6, 2006

(65) Prior Publication Data

US 2006/0151263 A1 Jul. 13, 2006

Related U.S. Application Data

(62) Division of application No. 10/724,686, filed on Dec. 2, 2003, now abandoned.

(30) Foreign Application Priority Data

Dec. 3, 2002 (JP) ............................. 2002-351606

(51) Int. Cl.
*F16D 51/00* (2006.01)
(52) U.S. Cl. .............. 188/77 W; 188/77 R; 188/250 B
(58) Field of Classification Search .............. 188/77 R, 188/77 W, 78, 250 B, 264 B, 264 E; 427/230, 427/256, 355
See application file for complete search history.

(56) References Cited

U.S. PATENT DOCUMENTS

| 5,012,905 A | 5/1991 | Tanaka | 188/77 W |
| 5,083,642 A | 1/1992 | Stefanutti et al. | 188/77 W |
| 5,135,082 A | 8/1992 | Umezawa et al. | 188/77 W |
| 5,476,160 A | 12/1995 | Fenoglio et al. | 188/77 W |
| 5,975,253 A * | 11/1999 | Umezawa et al. | 188/77 R |
| 6,197,371 B1 * | 3/2001 | Sakai et al. | 427/238 |
| 6,260,671 B1 | 7/2001 | Fujita | 188/77 W |
| 6,374,961 B1 | 4/2002 | Koike et al. | 188/77 R |
| 6,513,630 B1 | 2/2003 | Nakagomi | 188/77 |

FOREIGN PATENT DOCUMENTS

JP 2001-140954 5/2001

* cited by examiner

*Primary Examiner*—Melody M. Burch
(74) *Attorney, Agent, or Firm*—Miles & Stockbridge P.C.

(57) ABSTRACT

In a double-wrap band brake assembly, an intermediate band is provided with a first friction material forming a first friction surface from a portion of the intermediate band near an apply bracket to a predetermined intermediate portion thereof, the first friction surface working for forming a lubricant film. The intermediate band is further provided with a second friction material having a thickness that is larger than a thickness of the first friction material and forming a second friction surface from the predetermined intermediate portion to a vicinity of a coupling portion of the intermediate band with a pair of outer bands, the second friction surface working for removing the lubricant film.

6 Claims, 15 Drawing Sheets

DOUBLE-WRAP BRAKE BAND ASSEMBLY

CROSS-REFERENCE TO RELATED APPLICATION

This application is a division of application Ser. No. 10/724,686 filed Dec. 2, 2003 now abandoned.

This application claims the benefit of Japanese Patent application No. 2002-351606 which is hereby incorporated by reference.

BACKGROUND OF THE INVENTION

1. Field of the Invention

The present invention relates to a double-wrap brake band assembly which is used in an automatic transmission, or the like, for a car, and to a technology for facilitating and securing a braking control.

2. Related Background Art

A band brake apparatus is widely used for braking a transmission element or rotation element in an automatic transmission for a car or in a general industrial machine. A band brake apparatus generally comprises a brake band which is formed by attaching a frictional material to the inner peripheral surface of one steel plate in an annular form. This brake band is constricted by an actuator to fasten a transmission element or a rotation element disposed on the inner side thereof to apply the brake. Therefore, recently, in order to reduce the working power of the actuator and to enhance the controllability of the brake, there is proposed a double-wrap band brake assembly which employs a double-wrap brake band.

As illustrated in FIG. 20 and FIG. 21 (a view seen in the direction indicated by the arrow F in FIG. 20), a double-wrap brake band 3 of a double-wrap band brake assembly is mainly composed of an annular middle band 11 and a pair of annular outer bands 15 which are welded to the middle band 11 through a coupling plate 13 in a state that the respective free ends thereof of the outer bands 15 are opposed to the free end of the middle band 11. Frictional materials 17 and 19 are attached to the inner peripheral surfaces of the middle band 11 and the outer bands 15, respectively. While an anchor bracket 21 which is latched by an anchor pin 5 on the side of a main body casing 1 is welded to the working ends of the outer bands 15, an apply bracket 25 for receiving a force in the direction in which the middle band 11 and the outer bands 15 are constricted by means of a push rod (apply pin) 23 of an actuator 7 is welded to the working end of the middle band 11. In this double-wrap brake band 3, when the apply pin 23 of the actuator 7 is operated in the direction indicated by the arrow in FIG. 20, the middle band 11 and the outer bands 15 are constricted so as to brake a transmission element (hereinafter called the drum) 27 which is fitted in the double-wrap brake band 3.

Incidentally, when the conventional double-wrap band brake assembly is used to brake a rotation element or the like of an automatic transmission, it sometimes becomes a hindrance to a smooth gear change operation. For example, in the above-described double-wrap brake band 3, when it is driven by the apply pin 23 and constricted to thereby come into sliding contact with the drum 27, the bands 11 and 15 wrap around the drum 27 therein by the self engagement effect. As a result, as indicated by the broken line in FIG. 4, a value of the dynamic friction coefficient at the beginning of braking momentarily rises so as to apply the brake on the drum 27 rapidly, whereby, as indicated by the broken line in FIG. 5, a ratio of torque transmission reaches 100% in an extremely short period, and a comparatively large gear change shock is brought about. Particularly, in an area with a small throttle angle in which the transmission torque is comparatively small, a correct braking control is required. However, in the double-wrap band brake assembly, a working stroke of the apply pin 23 is large, which results in a deteriorated response performance and a large torque capacity. As a result, it is very difficult to control a servo pressure and a servo working amount. That is, it is desirable that the bands 11 and 15 come into sliding contact with the drum 27 with a predetermined sliding at the beginning of the brake. However, if the servo pressure and the servo working amount fluctuate, the brake is applied with a little or no sliding amount so as to produce a great transmission shock.

On the other hand, the present inventors, et al., attempted to cause practically no self engagement effect described above by positively introducing an automatic transmission oil into between the double-wrap brake band 3 and the drum 27. However, in this case, with advance of constriction of the double-wrap brake band 3 and the removal of the automatic transmission oil, the dynamic friction coefficient between the double-wrap brake band 3 and the drum 27 gradually increases correspondingly, as shown by the two dot chain line in FIG. 4. Thereby, the drum 27 is slowly braked and, as indicated by the broken line in FIG. 5, a comparatively long time is required for obtaining 100% of the torque transmission ratio. As a result, it becomes difficult to detect a brake starting point of the double-wrap band brake assembly, so that driving control of another transmission element of the automatic transmission can not be smoothly effected.

SUMMARY OF THE INVENTION

The present invention has been contrived in view of the above-described circumstances, and an object thereof is to provide a double-wrap band brake assembly which can realize facilitated and reliable braking control while preventing a rapid increase of a dynamic friction coefficient at the beginning of the braking.

In order to solve the above problems, according to the present invention, there is provided a double-wrap band brake assembly for braking a rotating member fitted in a double-wrap brake band comprising: an annular middle band with a friction surface formed on the inner periphery thereof; a pair of annular outer bands which are coupled to the middle band in a state that the respective free ends thereof are opposed to the free end of the middle band, and which respectively have friction surfaces on the inner peripheries thereof; an anchor bracket secured to the working end of either one of the middle band and the outer bands and latched to the main body casing; and an apply bracket secured to the working end of the other of the middle band and the outer bands for receiving a force in the direction of constriction of the middle band and the outer bands from an actuator, wherein at least one of the middle band and the outer bands is provided with a first friction surface which is brought into sliding contact with the rotating member with a first dynamic friction coefficient at the beginning of the braking and a second friction surface which is brought into sliding contact with the rotating member with a second dynamic friction coefficient larger than the first dynamic friction coefficient at the beginning of the braking.

Also, in the double-wrap band brake assembly of the present invention, the first friction surface may preferably be formed on the apply bracket and the second friction surface may preferably be formed in the vicinity of a position at which the middle band is coupled to the outer bands.

Also, in the double-wrap band brake assembly of the present invention, the frictional materials are preferably attached to both the first and second friction surfaces and the dynamic friction coefficient between the frictional material attached to the second friction surface and the rotating member may be larger than the dynamic friction coefficient between the frictional material attached to the first friction surface and the rotating member.

Also, in the double-wrap band brake assembly of the present invention, it is preferable that the double-wrap brake band is lubricated with liquid and a liquid film of this liquid is formed between the first friction surface and the rotating member at the beginning of the braking.

Also, in the double-wrap band brake assembly of the present invention, the liquid film may preferably be removed from between the second friction surface and the rotating member at the beginning of the braking.

Also, in the double-wrap band brake assembly of the present invention, it is preferable that a frictional material which is gradually thicker along the direction of rotation of the rotating member is attached to the first friction surface in order to form the liquid film.

Also, in the double-wrap band brake assembly of the present invention, the first frictional material may preferably have an angle of 0.01° to 30° with respect to the double-wrap brake band as seen from a side thereof in a state that the double-wrap brake band is developed in a planar manner.

Also, in the double-wrap band brake assembly of the present invention, in order to form the liquid film, the frictional material for forming the first friction surface may preferably be set to be thinner than the frictional material for forming the second friction surface.

Also, in the double-wrap band brake assembly of the present invention, the liquid film may preferably be removed by a corner portion of the end surface of the second frictional material facing an axial groove formed on the double-wrap brake band.

Also, in the double-wrap band brake assembly of the present invention, the angle of the corner portion of the end surface may preferably be set to be 10° to 90° with respect to the double-wrap brake band as seen from a side thereof in a state that the double-wrap brake band is developed in a planer manner.

Also, in the double-wrap band brake assembly of the present invention, on the second friction surface, a slanting portion may be formed in order to avoid a step between the second friction surface and the first friction surface.

Also, in the double-wrap band brake assembly of the present invention, the removal of the liquid film may preferably be performed on the second friction surface which is sandwiched by and between a pair of grooves formed in the axial direction.

Also, in the double-wrap band brake assembly of the present invention, one of the paired grooves which is used for removing the liquid film may preferably be disposed in the vicinity of a position at which the middle band is coupled to the outer bands.

Also, in the double-wrap band brake assembly of the present invention, the groove used for removing the liquid film may preferably be disposed on the middle band and be conductively connected to the outer bands.

Also, in the double-wrap band brake assembly of the present invention, it is preferable that the removed liquid film produces a liquid reservoir on the second friction surface.

Also, in the double-wrap band brake assembly of the present invention, the liquid reservoir may preferably be disposed in the vicinity of a position at which the middle band is coupled to the outer bands.

Also, in the double-wrap band brake assembly of the present invention, the groove used for removing the liquid film may preferably be disposed on the middle band.

According to the double-wrap band brake assembly of the present invention, it is preferable that the dynamic friction coefficient between the brake band and the rotating member at the beginning of the braking is decreased to realize a smooth braking operation and, when it is employed in an automatic transmission, a shock caused by gear change can be reduced.

DETAILED DESCRIPTION OF THE PREFERRED EMBODIMENTS

Detailed description will be made below on several embodiments of the present invention in which the present invention is applied to a double-wrap band brake assembly of an automatic transmission for a car, with reference to the attached drawings.

Figure 1:
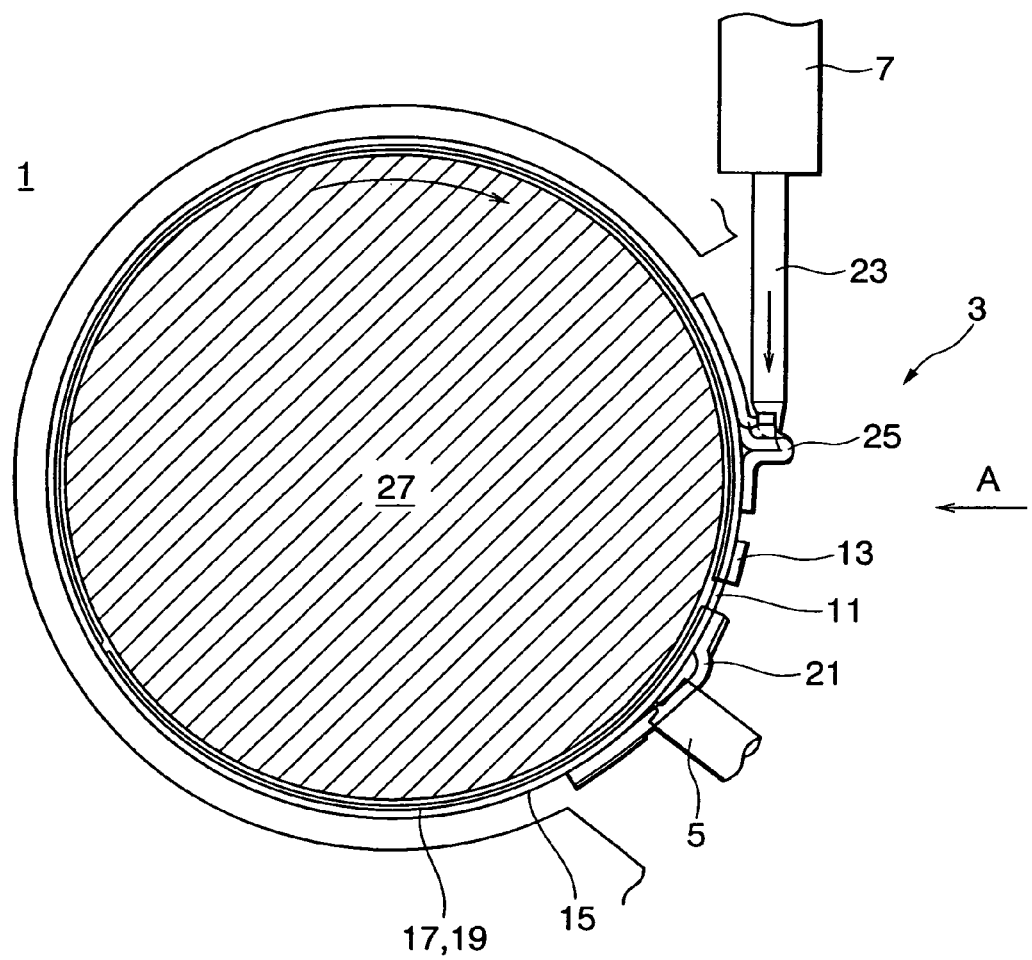
FIG. 1 is a side view for showing a double-wrap band brake assembly according to a first embodiment of the present invention.
Figure 2:
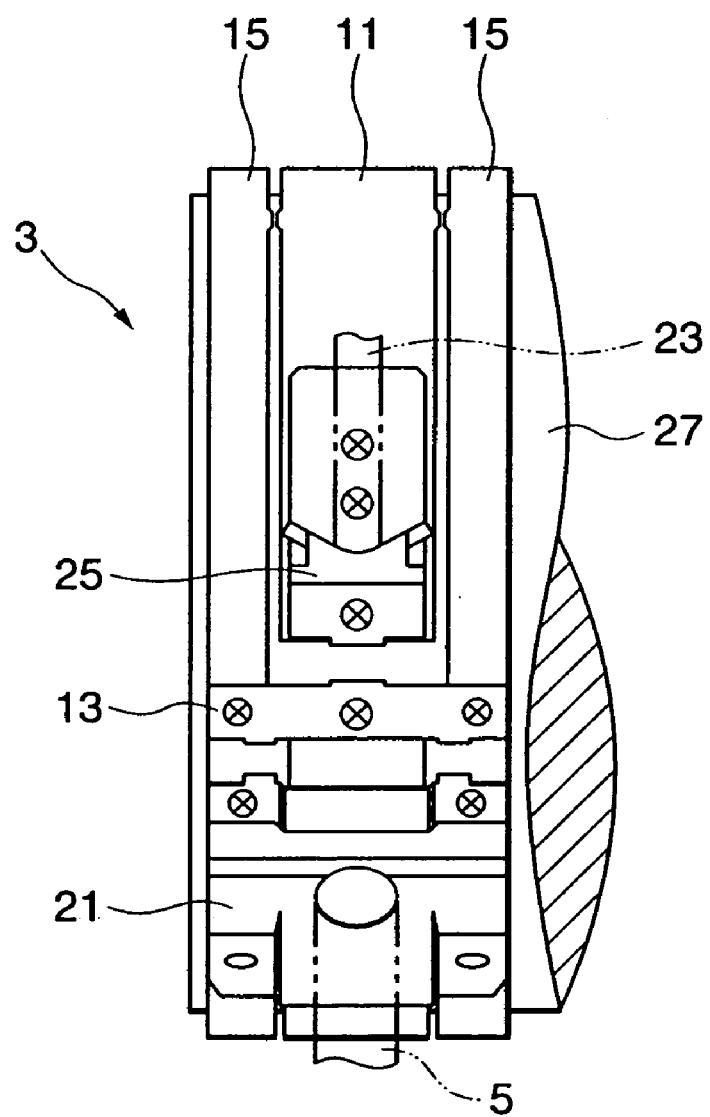
FIG. 2 is a view seen from the arrow A in FIG. 1.
Figure 3:
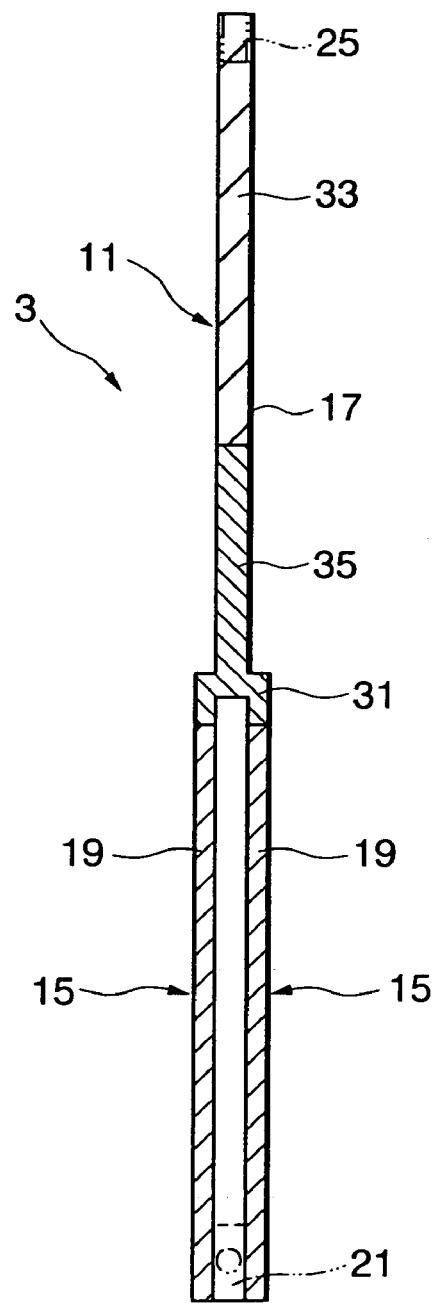
FIG. 3 is a developed diagram of a double-wrap brake band according to the first embodiment, seen from the side of a friction surface thereof.

FIG. 1 is a side view for showing a double-wrap band brake assembly according to the first embodiment of the present invention, FIG. 2 is a view seen from the arrow A in FIG. 1 (view seen from the front thereof), and FIG. 3 is a developed diagram of the double-wrap brake band, seen from the friction surface side. As seen from these drawings, the double-wrap band brake assembly of the present embodiment is comprised of a main body casing (transmission casing) 1, a double-wrap brake band 3 set inside the main body casing 1, an anchor pin 5 for securing the double-wrap brake band 3 to the main body casing 1, and an actuator 7 for driving the double-wrap brake band 3.

The double-wrap brake band 3 is mainly comprised of an annular intermediate band 11 (middle band in the illustrative embodiment), and a pair of annular outer bands 15 which are welded to the middle band 11 through a coupling plate 13 in a state that the respective free ends thereof are opposed to the free end of the middle band 11. Frictional materials 17 and 19 are attached to the inner peripheral surfaces of the middle band 11 and the outer bands 15, respectively. An anchor bracket 21 which is to be latched by an anchor pin 5 on the side of the main body casing 1 is welded to the working ends of the outer bands 15, while an apply bracket 25 which receives a force in the direction in which the middle band 11 and the outer bands 15 are constricted from an apply pin 23 of the actuator 7 is welded to the working end of the middle band 11. In this double-wrap brake band 3, when the apply pin 23 of the actuator 7 is operated in the direction indicated by the arrow in FIG. 1, the middle band 11 and the outer bands 15 are constricted, thereby braking the drum 27 which is fitted in the double-wrap brake band 3. Note that the double-wrap brake band 3 is lubricated with an automatic transmission oil (ATF) which is supplied from the axis side of the drum 27.

In the double-wrap brake band 3 of the first embodiment, as shown in FIG. 3, a predetermined range (about ⅗ as large as the total length of the middle band 11) on the side of the apply bracket 25 of the middle band 11 is called a low friction surface (first friction surface) 33 which has a comparatively low dynamic friction coefficient with the drum 27, while a range from a vicinity of the coupling portion 31 with the outer bands 15 to the border with the low friction surface 33 is called a high friction surface (second friction surface) 35 which has a higher dynamic friction coefficient than that of the low friction surface 33.

Figure 4:
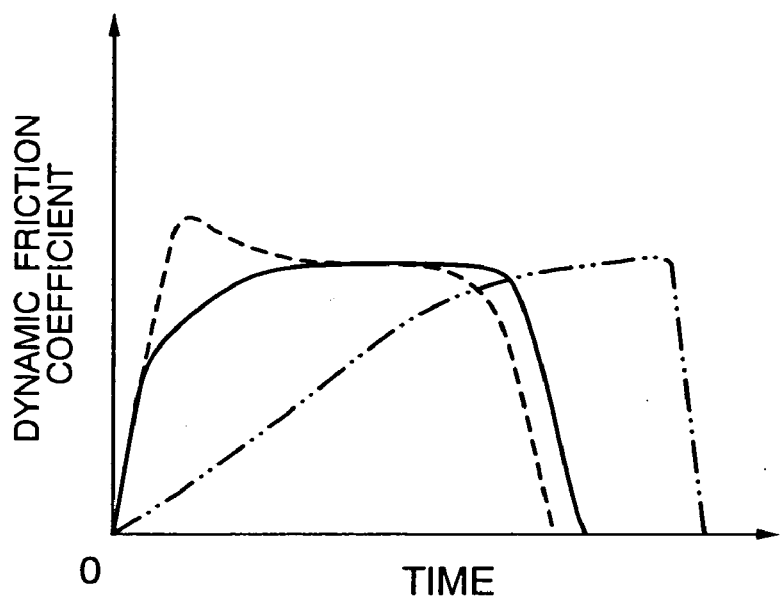
FIG. 4 is a graph for showing a temporal change of a dynamic friction coefficient between the double-wrap brake band and a drum.
Figure 5:
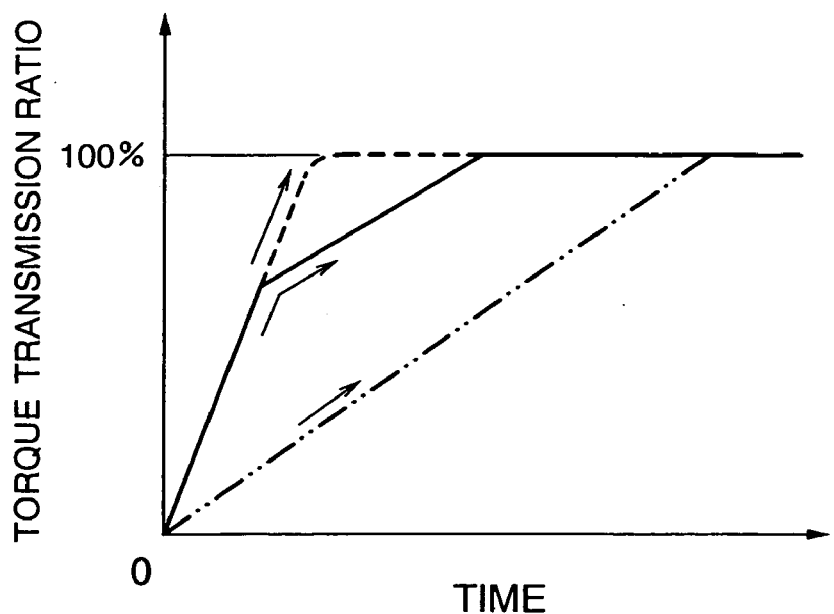
FIG. 5 is a graph for showing a temporal change of a torque transmission ratio between the double-wrap brake band and the drum.

Since the first embodiment employs such a structure, when the double-wrap brake band 3 which is driven by the apply pin 23 is constricted to be brought into sliding contact with the drum 27, the high friction surface 35 is engaged with the drum 27 by the self engagement effect comparatively rapidly while the low friction surface 33 is engaged with the drum 27 comparatively slowly. As a result, as indicated by the solid line in FIG. 4, the dynamic friction coefficient between the double-wrap brake band 3 and the drum 27 rises in a short time and thereafter is kept substantially at the same level. Thus, the braking of the drum 27 is effected rapidly and smoothly, and the torque transmission ratio reaches 100% in a comparatively short period, as indicated by the solid line in FIG. 5.

In the first embodiment, it is possible to arbitrarily adjust a change in the dynamic friction coefficient between the double-wrap brake band 3 and the drum 27 by properly selecting materials for the low friction surface 33 and the high friction surface 35 or by properly setting an area ratio between the low friction surface 33 and the high friction surface 35. For this reason, when a torque capacity of the double-wrap band brake assembly is variously changed or the time required for this ratio to reach 100% is varied, such situation can be coped with the same assembly.

Figure 6:
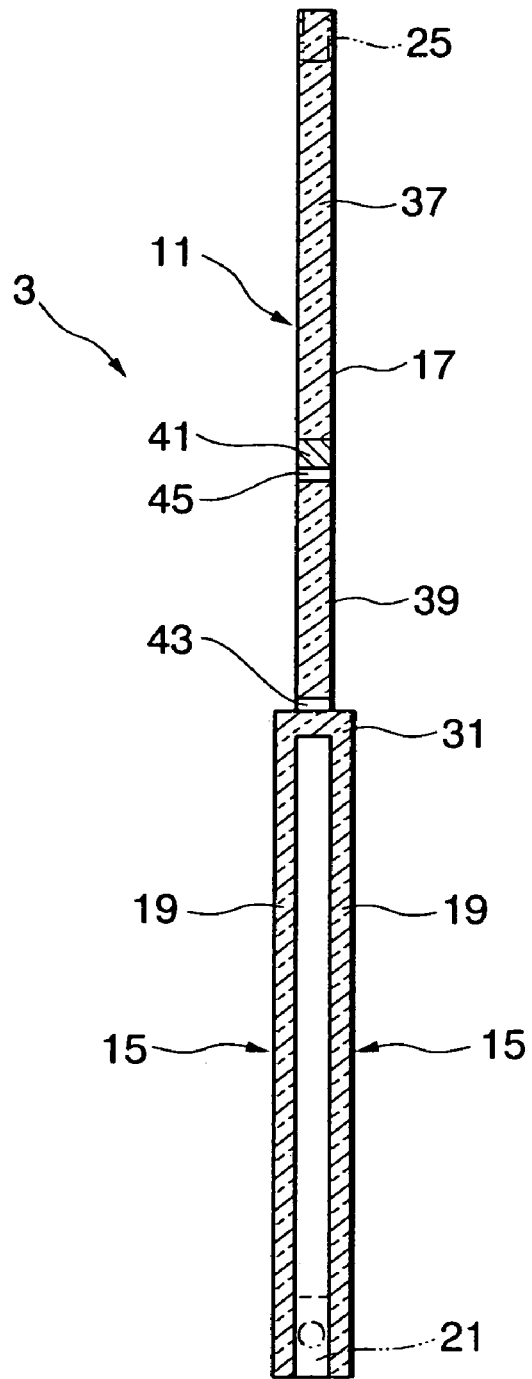
FIG. 6 is a developed diagram of a double-wrap brake band according to a second embodiment of the present invention, seen from the side of a friction surface thereof.
Figure 7:
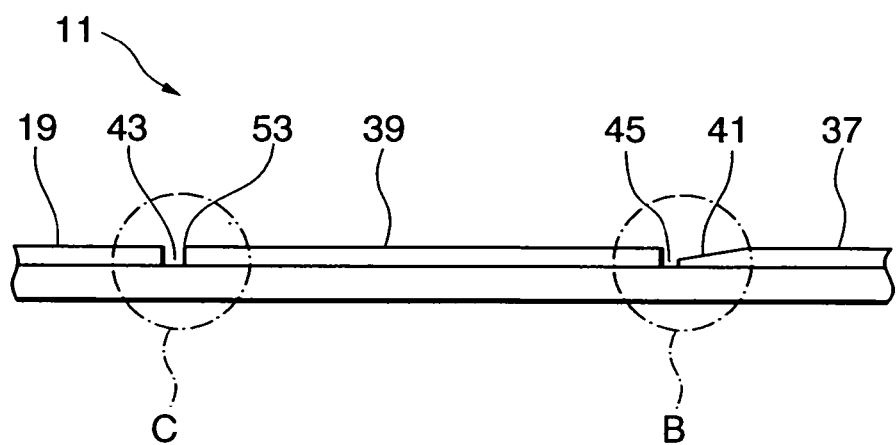
FIG. 7 is a side view for showing the double-wrap brake band according to the second embodiment.

FIG. 6 is a developed diagram of a double-wrap brake band according to the second embodiment of the present invention, seen from the side of a friction surface thereof, and FIG. 7 is a side view of the same double-wrap brake band. As shown in these drawings, in the double-wrap brake band 3 of the second embodiment, a predetermined range (about ⅗ as large as the total length of the middle band 11) on the side of the apply bracket 25 of the middle band 11 is called an oil film formation surface (first friction surface) 37 having an oil film formed with the drum 27, while an area from a vicinity of the coupling portion 31 with the outer bands 15 to the boarder with the oil film formation surface 37 is called an oil film removal surface (second friction surface) 39. In addition, a slanting surface 41 is formed at the end portion of the oil film formation surface 37 on the side of the oil film removal surface 39, and axial grooves 43 and 45 are respectively formed at the both ends of the oil film removal surface 39.

Figure 8:
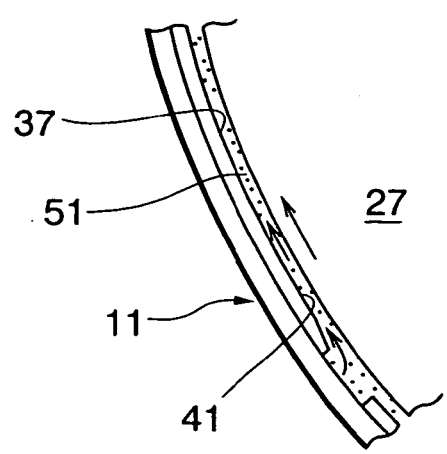
FIG. 8 is an explanatory view for illustrating an operation of the second embodiment.
Figure 9:
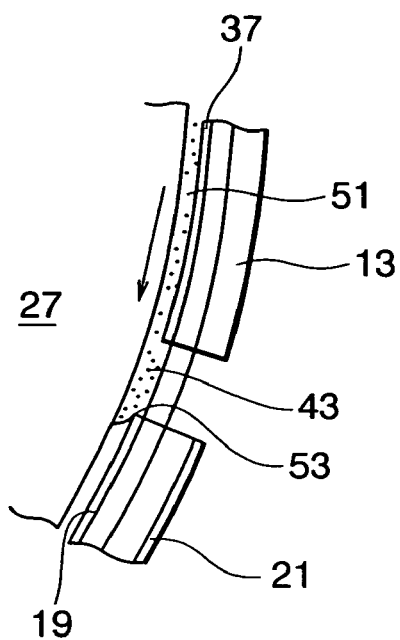
FIG. 9 is an explanatory view for illustrating the operation of the second embodiment.

Since the second embodiment employs such a structure as described above, when the double-wrap brake band 3 which is driven by the apply pin 23 is constricted to be brought into sliding contact with the drum 27, as shown in FIG. 8, an automatic transmission oil (ATF) existing between the band and the drum 27 is introduced onto the oil film formation surface 37 from the slanting surface 41 to become an oil film 51. On the other hand, on the oil film removal surface 39, as shown in FIG. 9, the oil film 51 is removed by a corner portion 53 on the side of the axial groove 43. Thus, in the same manner as in the first embodiment, the oil film removal surface 39 is engaged with the drum 27 by the self engagement effect comparatively rapidly while no engagement is performed on the oil film formation surface 37 until the oil film 51 between the surface 37 and the drum 27 is removed. As a result, as indicated by the solid line in FIG. 4, the dynamic friction coefficient between the double-wrap brake band 3 and the drum 27 rises in a short time and thereafter is kept substantially at the same level. Thus, the braking of the drum 27 is effected rapidly and smoothly, and the torque transmission ratio reaches 100% in a comparatively short period, as indicated by the solid line in FIG. 5.

Figure 10:
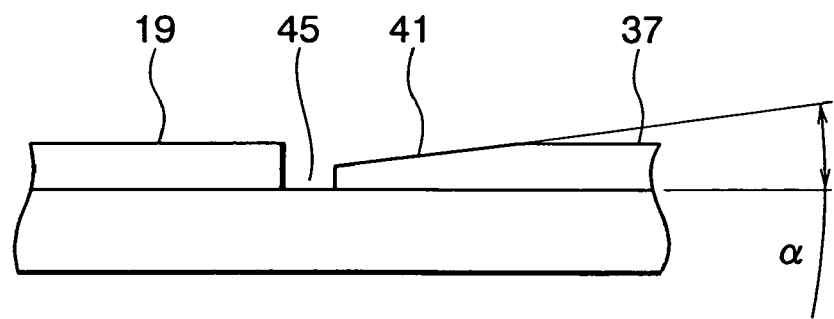
FIG. 10 is a view for showing the portion B in FIG. 7 in an enlarged manner.
Figure 11:
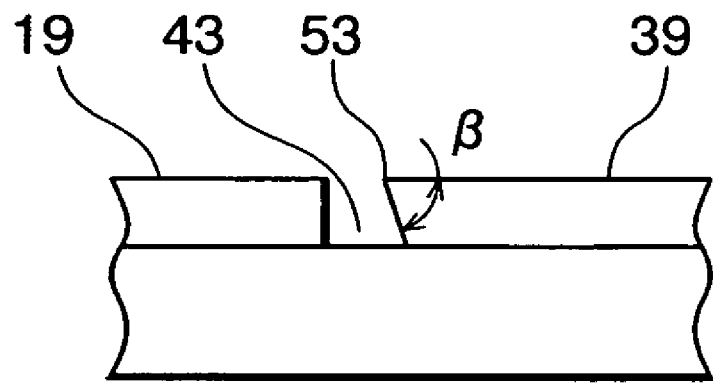
FIG. 11 is a view for showing the portion C in FIG. 7 in an enlarged manner.

In the second embodiment, it is possible to arbitrarily adjust a change in the dynamic friction coefficient between the double-wrap brake band 3 and the drum 27 by properly setting an angle α of the slanting surface 41 shown in FIG. 10 (an enlarged view of the portion B in FIG. 7) and an angle β of the corner portion 53 shown in FIG. 11 (an enlarged view of the portion C in FIG. 7). For this reason, when a torque capacity of the double-wrap band brake assembly is variously changed or the time required for this ratio to reach 100% is varied, such situation can be coped with the same assembly.

In the second embodiment, it is desirable that the angle α of the slanting surface 41 is within a range from 0.01° to 30°. The reason for this is that, when the angle α is 0.01° or smaller, it becomes very difficult to manufacture the double-wrap brake band 3 and also it becomes inevitable that the function of forming an oil film is gradually lost due to abrasion, or the like, caused by a long-term use. Also, when the angle α is 30° or larger, a resistance becomes too large so that the sufficient oil film 51 can not be formed on the oil film formation surface 37. On the other hand, it is desirable that the angle β of the corner portion 53 is within a range from 10° to 90°. The reason for that is, when the angle β is 10° or smaller, the corner portion 53 is resiliently deformed so that the oil film 51 may not be removed or the strength of the oil film may become insufficient. When the angle β is 90° or larger, there arises a fear that the oil film 51 is not removed, but is formed conversely.

Figure 12:
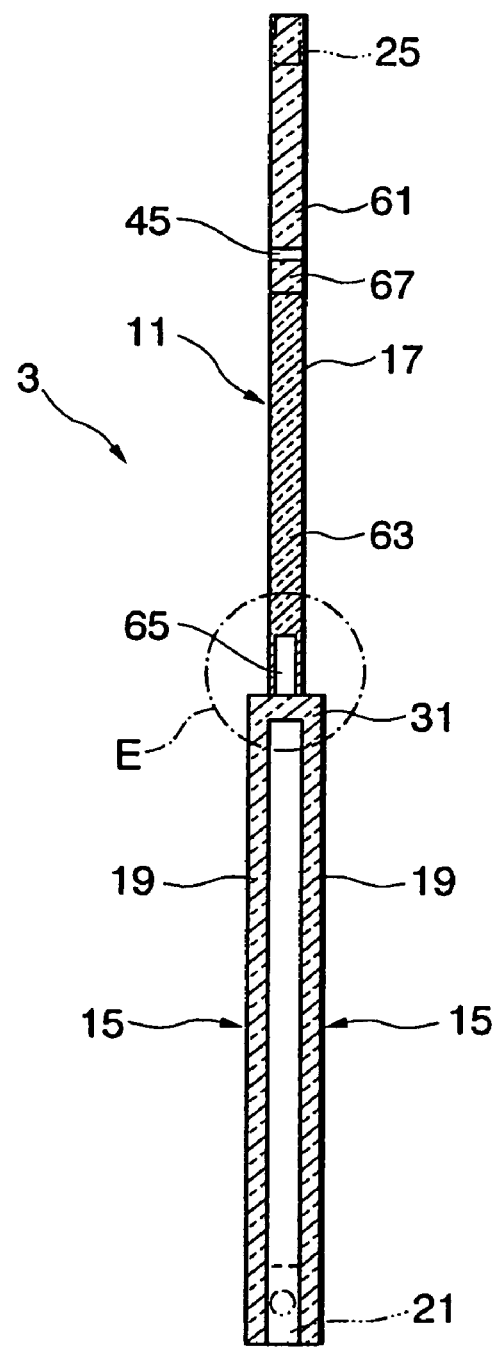
FIG. 12 is a developed diagram of a double-wrap brake band according to a third embodiment of the present invention, seen from the side of a friction surface thereof.
Figure 13:
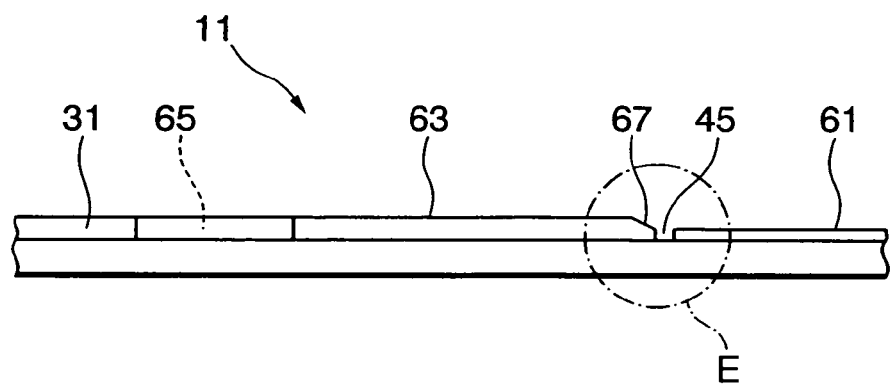
FIG. 13 is a side view for showing the double-wrap brake band according to the third embodiment.
Figure 14:
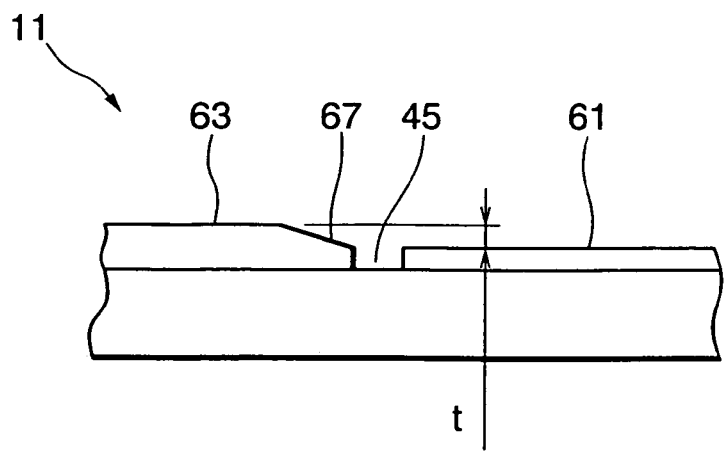
FIG. 14 is a view for showing the portion D in FIG. 13 in an enlarged manner.
Figure 15:
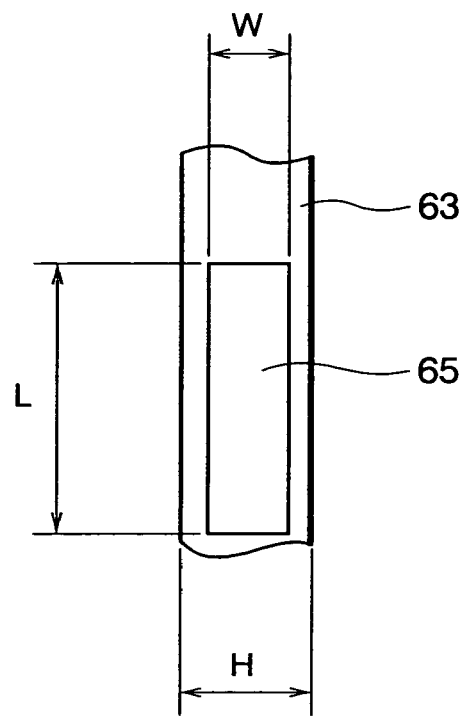
FIG. 15 is a view for showing the portion E in FIG. 12 in an enlarged manner.

FIG. 12 a developed diagram of a double-wrap brake band according to the third embodiment of the present invention, seen from the side of a friction surface thereof, and FIG. 13 is a side view of the same double-wrap brake band. FIG. 14 is a view for showing the portion D in FIG. 13 in an enlarged manner, and FIG. 15 is a view for showing the portion E in FIG. 12 in an enlarged manner. As shown in these drawings, in the double-wrap brake band 3 of the third embodiment, a over predetermined range (about ⅗ as large as the total length of the middle band 11) on the apply bracket 25 of the middle band 11 is formed a thin surface (first friction surface) 61, and an oil film is formed between the drum 27 and the thin surface, while an area from a vicinity of the coupling portion 31 with the outer bands 15 to the boarder with thin surface 61 is formed a thick surface (second friction surface) 63. In addition, on the thick surface 63, an oil reservoir 65 is formed in the vicinity of the coupling portion 31 with the outer bands 15, while a slanting portion 67 is formed in the vicinity of an end surface on the side of the thin surface 61. The slanting portion 67 is, as shown in FIG. 14, formed to have a form and dimensions to avoid a step t between the thin surface 61 and the thick surface 63.

Figure 16:
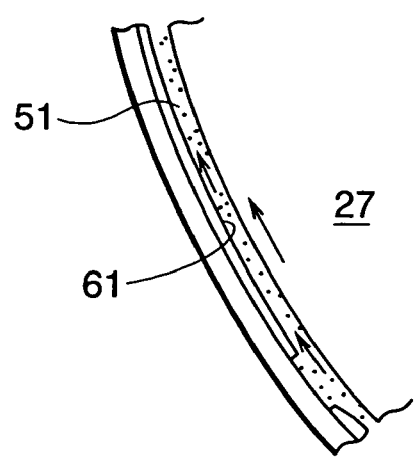
FIG. 16 is an explanatory view for illustrating an operation of the third embodiment.

Since the third embodiment employs such a structure, when the double-wrap brake band 3 which is driven by the apply pin 23 is constricted to be brought into sliding contact with the drum 27, an oil film 51 is formed on the thin surface 61 by an automatic transmission oil (ATF) existing between the thin surface 61 and the drum 27, as shown in FIG. 16. On the thick surface 63, the surface pressure around the oil reservoir 65 rises so that the dynamic friction coefficient is increased, thereby removing the oil film 51. Thus, the thick surface 63 is engaged with the drum 27 by the self engagement effect comparatively rapidly while no engagement is performed on the thin surface 61 until the oil film 51 between the surface 61 and the drum 27 is removed. As a result, as indicated by the solid line in FIG. 4, the dynamic friction coefficient between the double-wrap brake band 3 and the drum 27 rises in a short time and thereafter is kept substantially at the same level. Thus, the braking of the drum 27 is effected rapidly and smoothly, and the torque transmission ratio reaches 100% in a comparatively short period, as indicated by the solid line in FIG. 5.

Figure 17:
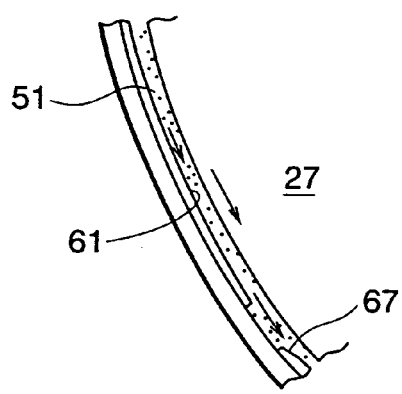
FIG. 17 is an explanatory view for illustrating the operation of the third embodiment.

Also, in the present embodiment, since the slanting portion 67 is formed near the end surface on the thick surface 63 on the side of the thin surface 61, the automatic transmission oil (ATF) existing on the side of the thin surface 61 is introduced, as shown in FIG. 17 onto the thick surface 63 smoothly along the slanting portion 67 also at the time of deenergy rotation in which the drum 27 and the double-wrap brake band 3 are rotated in the directions opposite to each other. Note that if there is no slanting portion 67, the automatic transmission oil (ATF) collides with an end surface of the thick surface 63 at the deenergy rotation so as to inconveniently produce abnormal noise or vibration.

In the third embodiment, it is possible to arbitrarily adjust a change in the dynamic friction coefficient between the double-wrap brake band 3 and the drum 27 by properly changing the thickness of the thin surface 61 or by changing the position, the dimensions and the form of the oil reservoir 65. For this reason, when a torque capacity of the double-wrap band brake assembly is variously changed or the time required for this ratio to reach 100% is varied, such situation can be coped with the same assembly.

Figure 18:
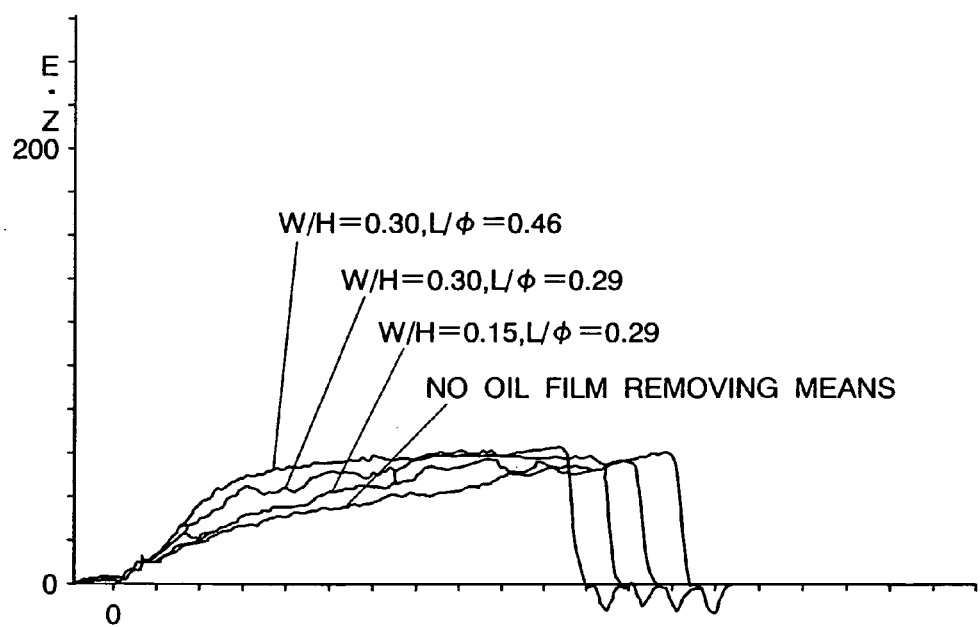
FIG. 18 is a graph for showing a test data according to the third embodiment.

In the third embodiment, as shown in FIG. 15, when the width of the oil reservoir 65 is W, the length is L, the width of the frictional material 17 is H, and the diameter of the drum 27 is Φ, it is desirable that W/H is in a range from 0.05 to 1.0 and L/Φ is in a range from 0.02 to 3. If W/H is 0.05 or less, or L/Φ is 0.02 or less, the oil film 51 is not removed sufficiently. FIG. 18 is a graph for showing test data in the numerical range described above when the width H of the frictional material 17 is 27 mm and the diameter Φ of the drum 27 is 172.6 mm. As seen from FIG. 17, the transmission torque at the beginning of the braking is greater when the width W of the oil reservoir 65 is wider and the length L is longer, while the transmission torque at the beginning of the braking is smaller when the width W of the oil reservoir 65 is narrower and the length L is shorter.

Figure 19:
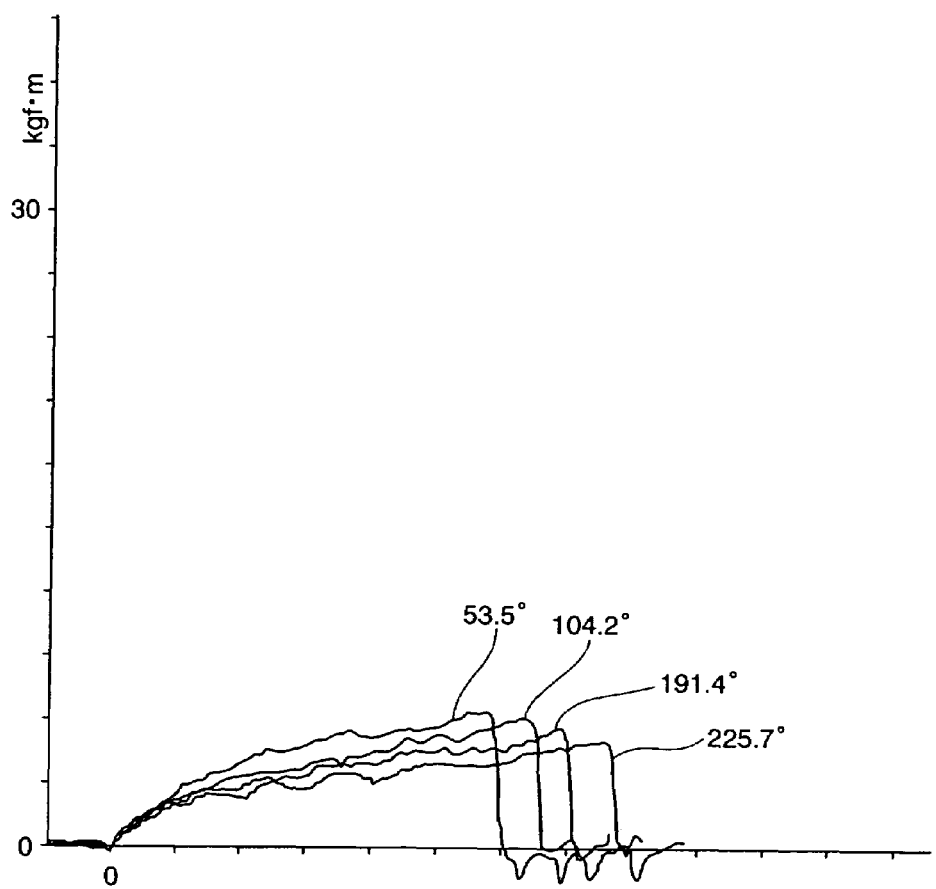
FIG. 19 is a graph for showing a test data according to the third embodiment.
Figure 20:
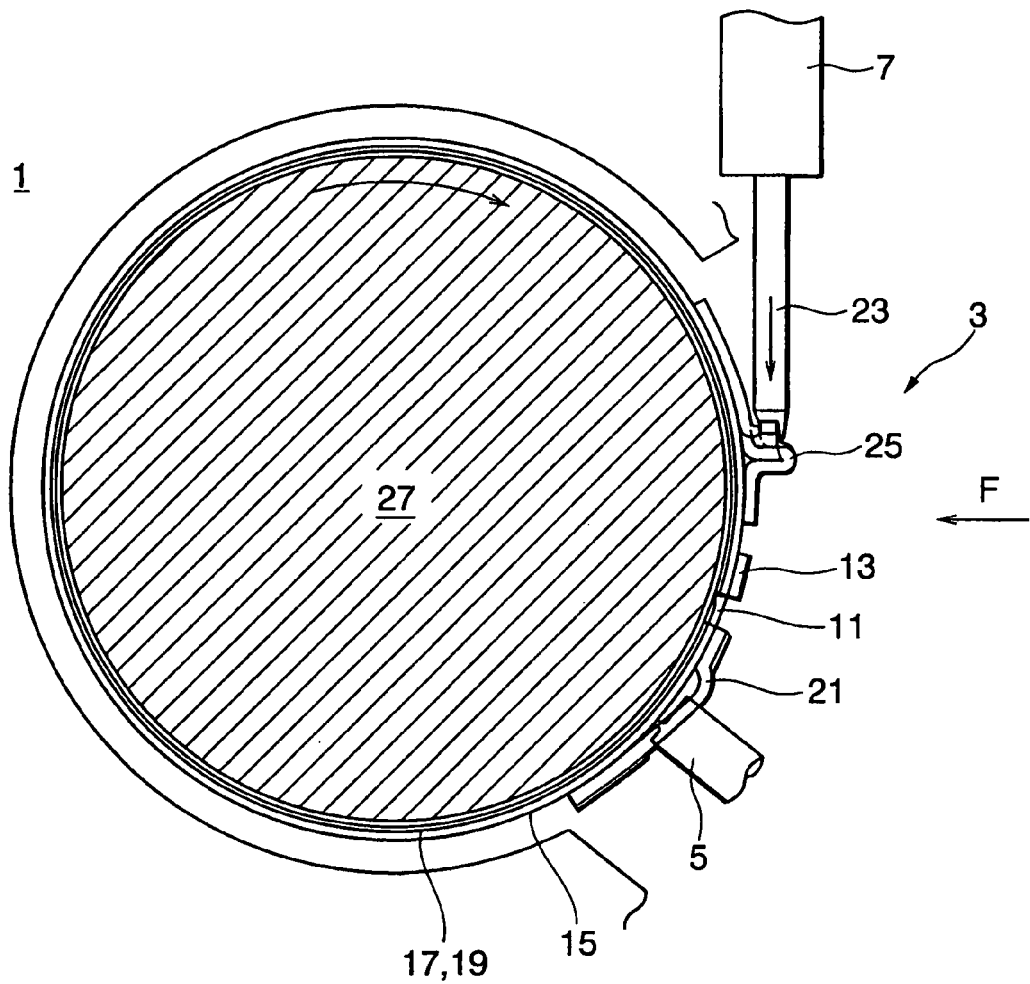
FIG. 20 is a side view for showing a double-wrap band brake assembly according to the prior art.
Figure 21:
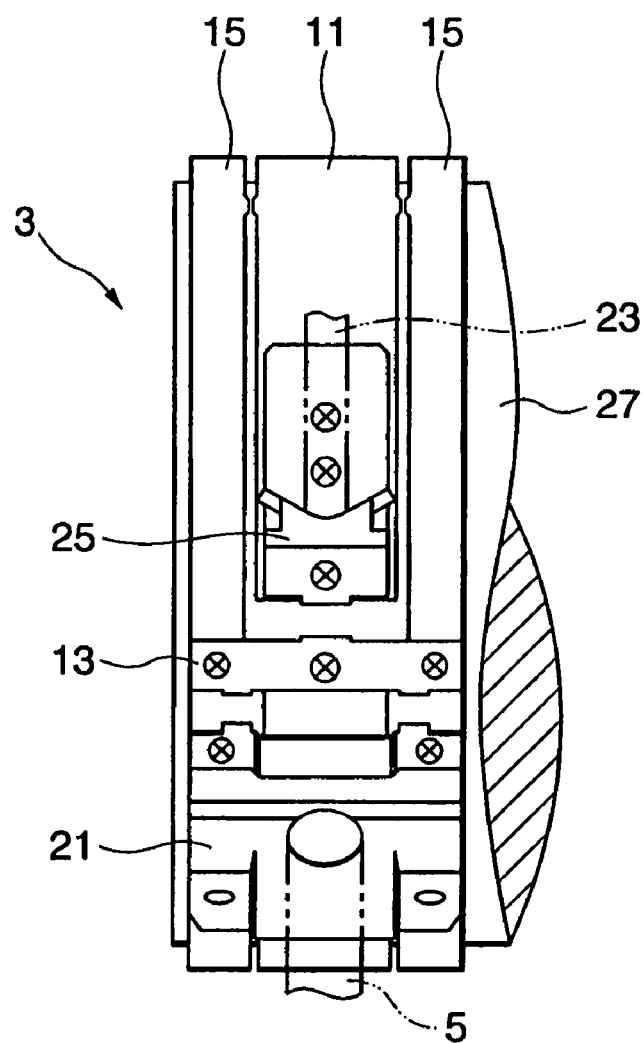
FIG. 21 is a view of the assembly in FIG. 20, seen from the arrow F.

On the other hand, in the third embodiment, the length of the thin surface 61 is set as around ⅓ as large as the total length of the middle band 11. However, this value can be properly varied in accordance with the required transmission torque. FIG. 19 shows measured values for the transmission torque when the distance (angle) from the end portion on the side of the apply bracket 25 to the axial groove 45 is varied. It is seen from this graph that the transmission torque is larger when the angle becomes smaller. Note that the angle in the third embodiment is 104.2°.

Though the specific description of the preferred embodiments is as stated above, the present invention is not limited to these embodiments. For example, in each of the foregoing embodiments, the present invention is applied to a double-wrap band brake assembly which is incorporated in an automatic transmission for a car. However, the present invention may be applied to a double-wrap band brake assembly which is used in an industrial machine, or the like. Also, in the foregoing embodiments, the first friction surface and the second friction surface are formed on the middle band. However, they may be formed on the outer bands, or on both of the middle band and the outer bands. A specific structure of the double-wrap band brake assembly including those of the first friction surface and the second friction surface can be properly altered within the scope and spirit of the present invention.

According to the double-wrap band brake assembly of the present invention, when the dynamic friction coefficient between the brake band and the rotating member at the beginning of the braking is decreased and when a smooth braking is realized and employed in an automatic transmission, a shock caused by a gear change can be reduced.

What is claimed is:

1. A double-wrap band brake assembly for braking a rotating member fitted in a double-wrap brake band, comprising:
   an annular intermediate band with a friction surface formed on an inner periphery thereof;
   a pair of annular outer bands which are coupled to the intermediate band in a state that respective free ends thereof are opposed to a free end of the intermediate band, and which have respective friction surfaces on inner peripheries thereof;

an anchor bracket secured to a working end of either one of the intermediate band and the outer bands and latched to a main body casing; and an apply bracket secured to a working end of the other of the intermediate band and the outer bands for receiving a force from an actuator in a direction of constriction of the intermediate band and the outer bands, wherein the intermediate band is provided with a first friction material forming a first friction surface from a portion of the intermediate band near the apply bracket to a predetermined intermediate portion thereof, the first friction surface working for forming a lubricant film, and wherein the intermediate band is provided with a second friction material having a thickness that is larger than a thickness of the first friction material and forming a second friction surface from the predetermined intermediate portion to a vicinity of a coupling portion of the intermediate band with the outer bands, the second friction surface working for removing the lubricant film.

2. A double-wrap band brake assembly according to claim 1 wherein the intermediate band is provided with an axially extended groove between the first friction material and the second friction material.

3. A double-wrap band brake assembly according to claim 2 wherein, between the first friction material and the axially extended groove, the intermediate band is provided with a slanting surface for introducing lubricant onto the first friction surface.

4. A double-wrap band brake assembly according to claim 2 wherein the intermediate band is provided with a second groove in the vicinity of the coupling portion between the intermediate band and the outer bands.

5. A double-wrap band brake assembly according to claim 1 wherein the second friction material is formed with a lubricant reservoir in the vicinity of the coupling portion between the intermediate band and the outer bands.

6. A double-wrap band brake assembly according to claim 2 wherein the intermediate band is provided with a second axially extended groove in the vicinity of the coupling portion between the intermediate band and the outer bands.

* * * * *